Figure 1:
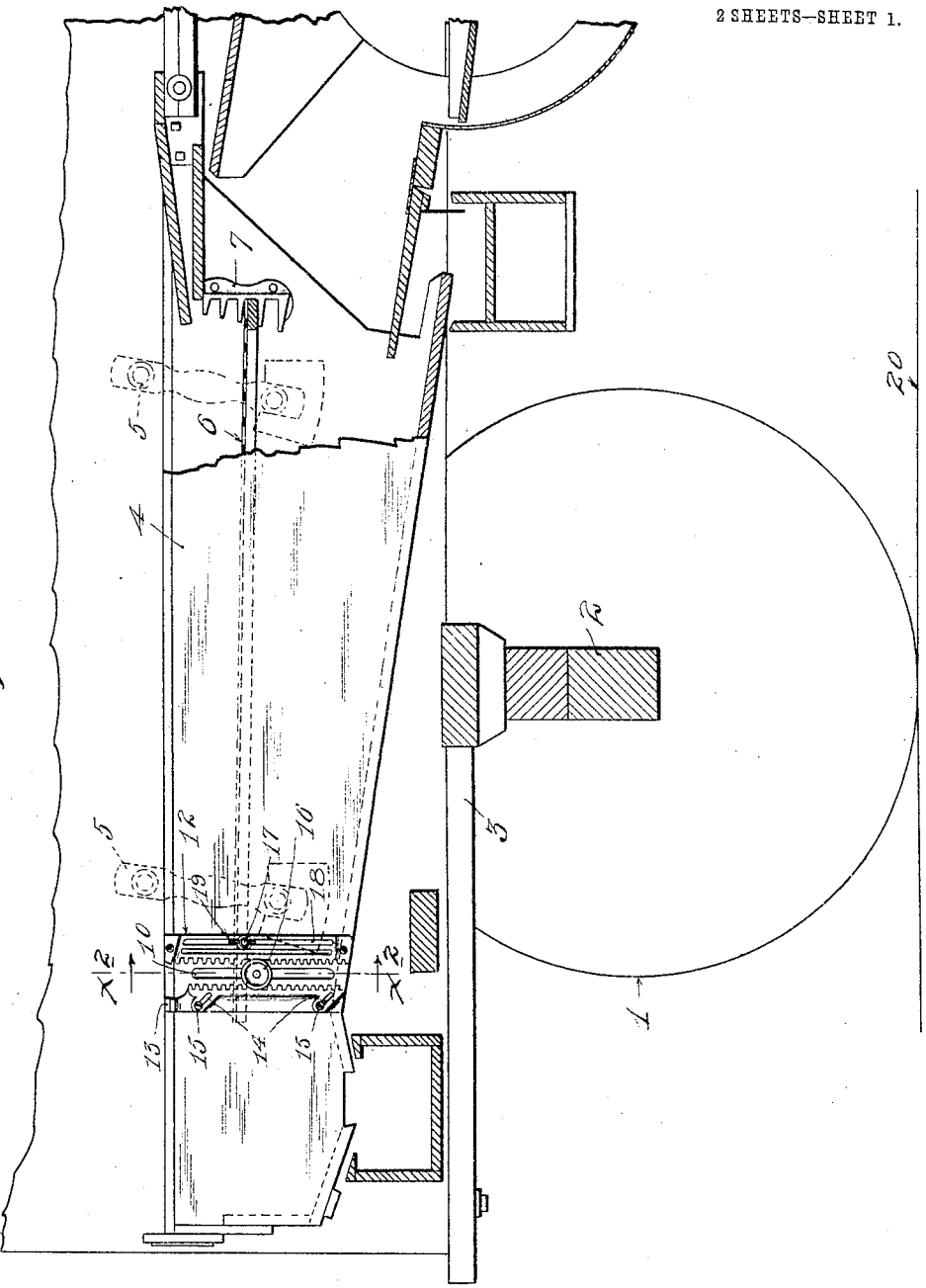

No. 779,424. PATENTED JAN. 10, 1905.
D. H. HOUSER.
SIEVE ADJUSTER.
APPLICATION FILED MAY 27, 1904.

2 SHEETS—SHEET 1.

Witnesses.
H. S. Kilgore.
A. H. Opsahl.

Inventor.
D. H. Houser,
By his Attorneys,
Williamson & Merchant

No. 779,424. PATENTED JAN. 10, 1905.
D. H. HOUSER.
SIEVE ADJUSTER.
APPLICATION FILED MAY 27, 1904.
2 SHEETS—SHEET 2.
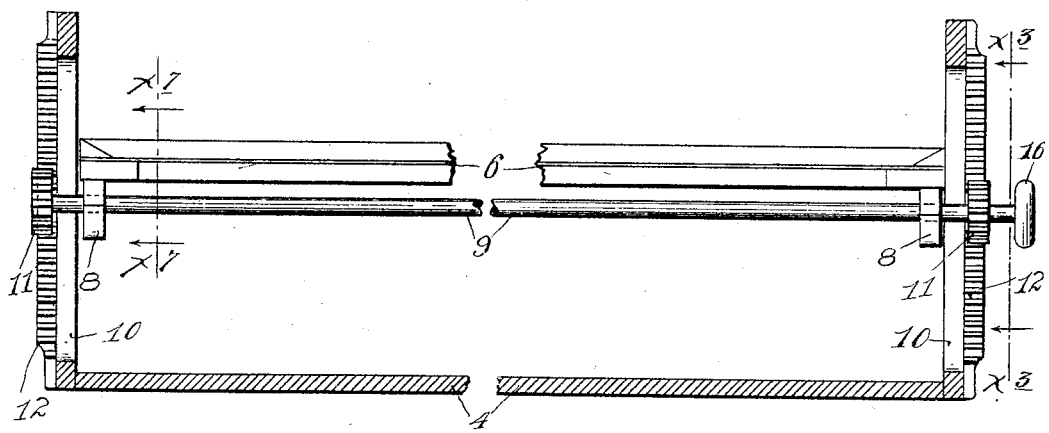
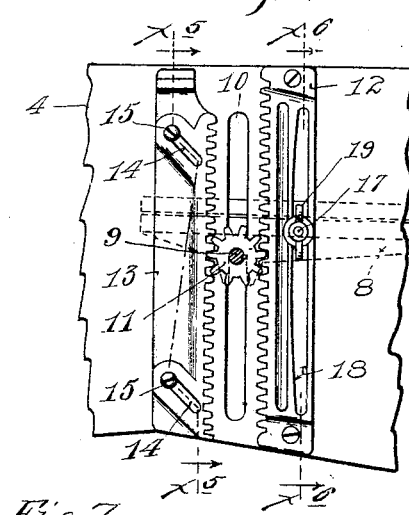
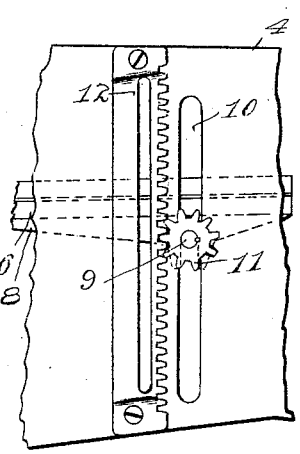
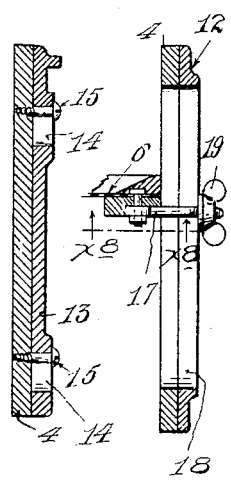
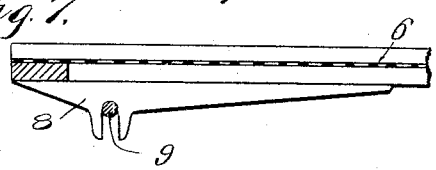
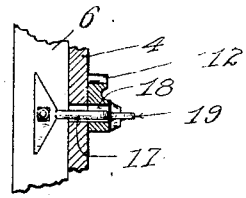
Witnesses.
H. D. Kilgore
A. H. Opsahl
Inventor.
D. H. Houser,
By his Attorneys,
Williamson & Merchant No. 779,424.

Patented January 10, 1905.

UNITED STATES PATENT OFFICE.

DAVID H. HOUSER, OF VALLEY CITY, NORTH DAKOTA.

SIEVE-ADJUSTER.

SPECIFICATION forming part of Letters Patent No. 779,424, dated January 10, 1905.

Application filed May 27, 1904. Serial No. 210,029.

*To all whom it may concern:*

Be it known that I, DAVID H. HOUSER, a citizen of the United States, residing at Valley City, in the county of Barnes and State of North Dakota, have invented certain new and useful Improvements in Sieve-Adjusters; and I do hereby declare the following to be a full, clear, and exact description of the invention, such as will enable others skilled in the art to which it appertains to make and use the same.

My invention has for its especial object to provide a vertically-adjustable carrier for the sieve of a threshing-machine-separator sieve-shoe, whereby the sieve can readily be set in any desired adjustment without requiring the machine to be stopped.

To this end my invention consists of the novel devices and combination of devices hereinafter described, and defined in the claim.

The invention is illustrated in the accompanying drawings, wherein like notations refer to like parts throughout the several views.

In said drawings, Figure 1 is a view in sectional elevation, showing the rear end portion of a threshing-machine separator with my improvement embodied therein. Fig. 2 is a vertical cross-section on the line $x^2 x^2$ of Fig. 1. Fig. 3 is a view chiefly in side elevation, but partly in section on the line $x^3 x^3$ of Fig. 2. Fig. 4 is an elevation showing the opposite side of the shoe as compared with Fig. 3. Fig. 5 is a section on the line $x^5 x^5$ of Fig. 3. Fig. 6 is a section on the line $x^6 x^6$ of Fig. 3. Fig. 7 is a section on the line $x^7 x^7$ of Fig. 2, and Fig. 8 is a section on the line $x^8 x^8$ of Fig. 6.

The numeral 1 represents one of the wheels, and 2 the axle of the rear truck of a threshing-machine separator.

The numeral 3 represents the separator-frame.

Numeral 4 represents the sieve-shoe suspended from the side plates of the frame by hangers 5 in the usual way. The sieve-shoe 4 is adapted to support a series of sieves 6, only one of which is shown in the drawings. The forward end of the sieve 6 is shown as mounted in one of the notches of a toothed head-plate 7 with sufficient teeth to afford seats for the desired number of sieves and adapted to hold the forward end of the sieves with freedom for a limited pivotal motion. As shown, the sieve 6 is provided with a pair of notched brackets 8, fixed to the rear end portion of the side bars of the sieve-frame, the notches of which embrace a supporting cross-shaft 9. The ends of said shaft 9 project out through vertical slots 10 in the side plates of the sieve-shoe and are provided with pinions 11, which engage with racks 12, fixed to said side plates of the shoe adjacent to the said vertical slots 10. A lock-rack 13 is provided with inclined slots 14, engaging screw-bolts 15, which connect the rack 13 to the side plate of the shoe with freedom for a limited sliding motion, so as to permit the same to engage with one of the pinions 11 of the shaft 9 and to coöperate with the adjacent fixed rack 12 to hold the said pinion 11 and the shaft 9, and hence the sieve 6, in any desired vertical adjustment in respect to the fixed racks 12. The shaft 9 is provided at one of its projecting ends with a handpiece 16. With this construction it is obvious that by sliding the lock-rack 13 away from the adjacent pinion 11 the operator, taking hold of the handpiece 16, can raise or lower the shaft 9 and the sieve supported thereby by simply turning the shaft and then can secure the same in any desired set position by permitting the lock-rack 13 to drop back into locking engagement with the pinion 11. It follows, of course, that the sieve or sieves supported by the shaft 9 can be vertically adjusted on the shoe as may be required to set the sieve at the proper pitch for the best action on the stock under any predetermined blast, and this adjustment can be made while the machine is in action.

To prevent any jumping action of the sieve or sieves in respect to the shaft 9, I have shown a draw-bolt 17 anchored in one of the brackets 8, fixed to the sieve-frame and extending outward through a slot 18 in one of the racks 12 and provided with a thumb-nut 19, by which the sieve-carriers 8 may be clamped to the side plate of the shoe.

An adjustable sieve-carrier such as the one herein disclosed is especially serviceable on threshing-machine separators, as above noted; but it will be understood, of course, that the same is capable of application for the same function in sieve-shoes generally, whether in a threshing-machine separator or other forms of separators.

It will be understood that in case more than one sieve is to be supported by the vertically-adjustable shaft 9 the said sieves will all be mounted in or secured to a suitable carrier, such as the brackets 8, resting on the shaft and adjustable therewith. It will further be understood that the adjustable carrier-shaft might be applied at the front instead of at the rear ends of the sieves.

In the drawings the separator-frame is shown as standing on an incline lengthwise of the machine, as indicated by the ground-line 20 under the truck-wheels 1. This is a common situation when a threshing-machine separator is about to be set. With the adjustable carrier herein disclosed the sieves can be quickly adjusted to meet such a condition, making it a matter of indifference whether the separator-frame stands on a longitudinal level or not. It will further be understood that some of the details of construction might be changed without departing from the spirit of my invention.

What I claim, and desire to secure by Letters Patent of the United States, is as follows:

The combination with a sieve-shoe of vertical racks, fixed to the shoe, a cross-shaft supporting one end of the sieve or sieves and having pinions engaging said racks and a sliding lock-rack, coöperating with one of said pinions and fixed racks to hold the shaft and sieves in any desired set position, substantially as described.

In testimony whereof I affix my signature in presence of two witnesses.

DAVID H. HOUSER.

Witnesses:
R. T. STEINKE,
R. T. HEALY.